(12) United States Patent
van der Bijl et al.

(10) Patent No.: US 7,837,264 B2
(45) Date of Patent: Nov. 23, 2010

(54) CHILDREN'S SAFETY SEAT WITH GUIDE AND TENSION DEVICE

(75) Inventors: Willem Mees van der Bijl, Enschede (NL); Rob Heinemeijer, Hengelo (NL); Johannes Hendrikus Rikhof, Beuningen (NL); Okke van Mourik, Utrecht (NL); Henk Vertegaal, Hengelo (NL); Sander Weernink, Enschede (NL)

(73) Assignee: HTS Hans Torgersen & Sons AS, Kroderen (NO)

( * ) Notice: Subject to any disclaimer, the term of this patent is extended or adjusted under 35 U.S.C. 154(b) by 713 days.

(21) Appl. No.: 11/246,161

(22) Filed: Oct. 11, 2005

(65) Prior Publication Data

US 2006/0244292 A1 Nov. 2, 2006

(30) Foreign Application Priority Data

Apr. 29, 2005 (GB) .................................. 0508858.8

(51) Int. Cl.
*A47D 1/10* (2006.01)
(52) U.S. Cl. ................................ 297/256.16; 297/250.1
(58) Field of Classification Search ............. 297/250.1, 297/216.11, 468, 473, 256.16
See application file for complete search history.

(56) References Cited

U.S. PATENT DOCUMENTS

| | | | | |
|---|---|---|---|---|
| 4,186,961 A | * | 2/1980 | Farrell, Jr. et al. | 297/256.16 X |
| 4,604,773 A | * | 8/1986 | Weber et al. | 242/388.3 |
| 4,681,368 A | * | 7/1987 | Heath et al. | 297/256.16 X |
| 4,826,246 A | * | 5/1989 | Meeker | 297/256.15 |
| 5,031,962 A | * | 7/1991 | Lee | 297/484 |
| 5,160,186 A | * | 11/1992 | Lee | 297/479 |

(Continued)

FOREIGN PATENT DOCUMENTS

EP 0574848 6/1993

(Continued)

*Primary Examiner*—Rodney B White
*Assistant Examiner*—James Alex

(57) ABSTRACT

Children's safety seat comprises—a seat body comprising a sitting section and a back section, wherein the back section and the sitting section has an inner surface for the support of a child and an outer surface whereto a seat belt, is to be arranged, a base onto which the seat body is arranged, a carrying handle pivotally connected to the safety seat wherein the outer surface of the back section is provided with a guide for the seat belt, wherein the guide comprises at least a first guide portion providing for the seat belt to essentially follow the curvature of the outer surface of the back section, at least a second guide portion providing for the seat belt to be arranged angular to the outer surface of the back section. The carrying handle is provided with at least one tension device preferably for the first portion of a seat belt wherein the carrying handle in a first position places the tension device in a position wherein access is provided for the seat belt to be attached to or released from the tension device, and wherein the carrying handle in a second position places the tension device in a position wherein the seat belt is tensioned by the tension devices a belt receiving structure for a seat belt which belt receiving structure is arranged between the base and the seat body and comprises a belt twisting portion, which seat belt is twisted by the belt twisting portion and arranged to be passing between the belt receiving structure and the seat body and between the belt receiving structure and the base.

8 Claims, 9 Drawing Sheets

U.S. PATENT DOCUMENTS

| | | | |
|---|---|---|---|
| 5,277,472 A * | 1/1994 | Freese et al. | 297/256.16 X |
| 5,458,398 A * | 10/1995 | Meeker et al. | 297/250.1 |
| 5,487,588 A * | 1/1996 | Burleigh et al. | 297/253 |
| 5,527,094 A * | 6/1996 | Hiramatsu et al. | 297/250.1 |
| 5,567,007 A * | 10/1996 | Czernakowski et al. | 297/250.1 |
| 5,611,596 A * | 3/1997 | Barley et al. | 297/256.13 |
| 5,810,435 A * | 9/1998 | Surot | 297/250.1 |
| 5,839,789 A * | 11/1998 | Koledin | 297/250.1 X |
| 5,915,787 A * | 6/1999 | Brookman | 297/256.16 X |
| 6,152,528 A * | 11/2000 | van Montfort | 297/250.1 |
| 6,220,662 B1 * | 4/2001 | Franco-Vila et al. | 297/256.16 X |
| 6,247,208 B1 * | 6/2001 | Creech | 24/68 BT |
| 6,428,100 B1 | 8/2002 | Kain | |
| 6,447,060 B1 * | 9/2002 | Vila et al. | 297/256.16 X |
| 6,508,510 B2 * | 1/2003 | Yamazaki | 297/250.1 |
| 6,554,358 B2 * | 4/2003 | Kain | 297/256.13 |
| 6,672,663 B2 * | 1/2004 | Kain | 297/250.1 |
| 6,672,664 B2 * | 1/2004 | Yanaka et al. | 297/256.16 |
| 6,695,400 B2 * | 2/2004 | Washizuka et al. | 297/130 |
| 6,746,080 B2 * | 6/2004 | Tsugimatsu et al. | 297/256.16 X |
| 7,029,068 B2 * | 4/2006 | Yoshida et al. | 297/250.1 |
| 7,055,903 B2 * | 6/2006 | Balensiefer et al. | 297/250.1 X |
| 7,059,676 B2 * | 6/2006 | McNeff | 297/250.1 |
| 7,090,294 B2 * | 8/2006 | Balensiefer et al. | 297/256.14 |
| 7,163,265 B2 * | 1/2007 | Adachi | 297/256.12 |
| 7,195,315 B2 * | 3/2007 | Rikhof | 297/256.16 |
| 7,216,932 B2 * | 5/2007 | Emmert | 297/256.16 |
| 7,429,079 B2 * | 9/2008 | Baloga et al. | 297/250.1 |
| 2002/0084680 A1 | 7/2002 | Kain | |
| 2005/0156452 A1 * | 7/2005 | Biaud | 297/250.1 |
| 2008/0303325 A1 * | 12/2008 | Scholz | 297/250.1 |

FOREIGN PATENT DOCUMENTS

| | | |
|---|---|---|
| EP | 574848 | 12/1993 |
| EP | 0676309 | 3/1994 |
| EP | 676309 | 10/1995 |
| EP | 0732235 | 9/1996 |
| EP | 776784 | 6/1997 |
| EP | 0816161 | 1/1998 |
| EP | 1088695 | 4/2001 |
| EP | 1153789 | 11/2001 |
| EP | 1232902 | 8/2002 |
| EP | 1285810 | 2/2003 |
| EP | 1407922 | 4/2004 |
| EP | 1418086 | 5/2004 |
| WO | 2004/033251 | 4/2004 |
| WO | WO 2004/033251 | 4/2004 |
| WO | 2005/054002 | 6/2005 |
| WO | 2006/030246 | 3/2006 |

* cited by examiner

CHILDREN'S SAFETY SEAT WITH GUIDE AND TENSION DEVICE

The invention concerns a children's safety seat in accordance with the introductory part of the independent claims.

The invention concerns the arrangement of the children's safety seat in the passenger seat using a safety belt such as the three point safety belt in the car. More specifically the invention concerns the arrangement of a first portion of the safety belt such as the diagonal portion onto the safety seat, the arrangement of a second portion of the safety belt such as the lap portion onto the safety seat, and the tensioning of the first portion of the safety belt. For simplicity the first portion of the safety belt will be denoted the diagonal portion and the second portion of the safety belt will be denoted the lap portion. This use of term is not to be interpreted as a limitation to the scope of the claims.

The children's safety seat is especially suitable for small children belonging to the group 0+. The term 0+ is used to categorize children having a body weight up to 13 kg. A safety seat for this group of children will be placed in the vehicle facing backwards. However, the invention as described in this application may apply also to safety seats for other group of children, thus the safety seat may also be facing forward.

Prior art describe several solutions concerning the use of the three point safety belt to fasten the safety seat in the vehicle. EP732235 describes guides defining a strap path for a strap of an adult seat belt. EP816161, EP1088695, EP1285810, EP1153789, U.S. Pat. No. 6,230,370 disclose different devices for the tensioning of a seat belt.

The object of the invention is to provide a solution which improves crash behaviour, and which offer an easy installation of the seat belt onto the safety seat, which at the same time minimizes the risk for misuse. This object is obtained by an inventive concept of the children's safety seat as defined in the characterizing part of the independent claims. Further embodiments of the invention are defined in the dependent claims.

The invention provides a solution wherein the procedure for fastening the safety belt is easy to carry out, further the solution makes it easy for the user to check if he has arranged the seat belt correctly onto the safety seat.

The arrangement of the diagonal portion onto the safety seat in accordance with the invention provides several advantages over prior art such as; better frontal and rearward crash behaviour, increasing the width dimension of the side wall between the childs head and the car door to offer protection during a side impact crash. Further the users are stimulated to follow the indicated belt routing thereby preventing misuse and the belt routing guides the belt into a tensioning device.

The tensioning of the diagonal portion in accordance with the invention provides several advantages over prior art such as; the safety seat is firmly fixated to the car seat, the slack of the seat belt is reduced, the correct position of the safety seat is confirmed to the user.

The arrangement of the lap portion onto the safety seat in accordance with the invention provides several advantages over prior art such as; only a short belt is required, the lap portion obtains a correct position automatically. Further, the lap belt is positioned in the direction of a possible forward crash, hence the slack is reduced during a crash.

In accordance with a first aspect of the invention the safety seat comprises two seat sections, preferably a sitting section and a back section. The back section and the sitting section has an inner surface for the support of a child and an outer surface, whereto a seat belt preferably a first portion the seat belt such as the diagonal portion is to be arranged. The outer surface is provided with a guide for the seat belt, wherein the guide comprises at least a first guide portion providing for the seat belt to follow the curvature of the outer surface. The guide further comprises at least a second guide portion providing for the seat belt to be arranged angular to the outer surface of the safety seat. The second guide portion might have a contact surface for the seat belt, which contact surface is arranged angular to the outer surface of the back section.

In one embodiment of this first aspect of the invention the safety seat may include least a third guide portion for the seat belt, providing for the seat belt to be arranged perpendicular to the outer surface of the back section. The third guide portion might have a contact surface for the seat belt, which contact surface is arranged perpendicular to the outer surface of the back section.

The first guide portion may be positioned in the rear outer surface of the back section and preferably is arranged as a cut out or a recess. The contact surface of the first guide portion may be arranged coinciding with the outer surface or essentially parallel to the outer surface. The first guide portion may be arranged otherwise provided that the structure or the arrangement fulfils the function; providing for the seat belt to follow the curvature of the outer surface of the back section.

The second guide portion may be positioned in the outer side surface of the back section and may preferably be arranged as a cut out or a recess. The contact surface of the second guide portion may be arranged gradually more angular to the outer surface when moving from the area of the first guide portion towards the area of the third guide portion. The second guide portion may be arranged otherwise provided that the structure or the arrangement fulfils the function of providing for the seat belt to be arranged angular to the outer surface of the back section.

Other structures or arrangement might be used as guide portions such as hooks, buckles etc.

The contact surface of the second guide portion may be arranged sloped towards the third guide portion thereby providing for the seat belt to be guided into the third guide portion. The third guide portion may constituted by a recess arranged in the tension device of a carrying handle which is pivotally connected to the safety seat.

In a second aspect of the invention the safety seat comprises two seat sections, preferably a sitting section and a back section, and a carrying handle pivotally connected to the safety seat. The handle is arranged to be moved between various positions relative to the safety seat. Further the handle is provided with at least one tension device preferably for the first portion of a seat belt such as the diagonal portion. The carrying handle in a first position places the tension device in a position wherein access is provided for the seat belt to be attached to or released form the tension device. The carrying handle in a second position places the tension device in a position wherein the seat belt is tensioned by the tension device.

In a preferred embodiment of the second aspect of the invention, the tension device is caused to rotate when the carrying handle is moved between first and second position.

In addition to tension the seat belt, the tension device provides a holding function preventing the seat belt from slipping.

The tension device may be placed at the end portion of the carrying handle which end portions is pivotally connected to the safety seat. The tension device may comprise a recess preferably with a depth corresponding at least to the width of the seat belt and may have a circular cross section or any other suitable cross section. The recess may be provided with some kind of friction material such as rubber to keep the seat belt in the recess.

The tension device may also be arranged otherwise provided that it has structures or arrangements whereto the safety belt may be fastened and is arranged to be repositioned by the movement of the carrying handle.

Tensioning means may be provided to cooperate with the tension device to tension the seat belt. The tension device may function without any tensioning means as it in itself is capable of applying tension to the seat belt. The tensioning means may be constituted by different arrangements or structures. The tensioning means may be constituted by a pins or other structures providing tension, for instance two point tension, onto the belt when the tension device is placed in tension position. In a second embodiment the tensioning means may comprise a housing arranged around the tension device providing a space between the housing and the tension device. The space is arranged so that at least a portion of the seat belt is inserted into the space when the handle is placed in the second position.

The housing may comprise at least one housing element with a curved cross section and a length corresponding at least to the width of the seat belt. The housing element may extend around essentially half the circumference of the tension device. The space between the housing element and the tension may be essentially equal along the length of the housing element and the circumference of the tension device respectively.

The housing may comprise two housing elements each having the features as described above. The two housing elements are arranged around the circumference of the tension device providing two passages between the end portions of the two housing elements for the seat belt to be lead into and out of the housing.

In a third aspect of the invention the children safety seat comprises a seat body preferably constituted by a sitting section and a back section. The seat body is arranged onto a base. The safety seat comprises a belt receiving structure for a seat belt preferably the second portion of the seat belt, wherein the belt receiving structure is arranged between the base and the seat body. The belt receiving structure comprises a belt twisting portion. The belt twisting portion is twisting or folding the seat belt and thereby causes the seat belt to be passing between the belt receiving structure and the seat body and between the belt receiving structure and the base.

In accordance with a preferred embodiment of the third aspect of the invention the belt receiving structure comprises a first and second portion, wherein the twisting portion is arranged between the first and second portion or in the transition between the two portions. The seat belt is installed onto belt receiving structure and is thereby arranged in the area of the first portion of the belt receiving structure and in the area of the second portion of the belt receiving structure.

In one embodiment of the third aspect of the invention the first portion of the belt receiving structure is connected to the base and a second portion of the belt receiving structure is connected to the seat body. This arrangement facilitates the correct positioning of the seat belt onto the receiving structure.

The contact surface of the seat belt may be arranged in contact with a first contact surface of the first portion of the belt receiving structure and with the second contact surface of a second portion of the belt receiving structure respectively.

The belt receiving structure may be constituted by a plate body with a first surface defining the first contact surface, a second surface defining the second contact surface and an edge defining the belt twisting portion. The plate body may be arranged horizontal or inclined. The plate body may be provided with a first leg for attachment to the seat body and a second leg for attachment to the base.

In a preferred embodiment of the third aspect of the invention, belt receiving structure is fixed to a column which carries the weight of the safety seat and is connected to the base.

The belt receiving structure may be constituted by different structures or arrangement able to provide a twisting portion and placing the seat belt as described above. For instance the belt receiving structure may comprise a U-shaped or V-shaped structure wherein one of the legs constituting the U or V is connected to the base and the other leg is connected to the seat body. The middle portion of the U or the connection between the two legs of the V constitutes the twisting portion and the area where the seat belt is placed onto.

In one embodiment of the third aspect of the invention the belt receiving structure may be provided with a guiding structure comprising a first guiding element and a second guiding element for guiding the first portion of the seat belt onto the belt receiving structure. These guiding elements have an extension in the longitudinal direction of the safety seat. The guiding structure connected to the belt receiving structure may define a V or a U shape wherein each of the legs of the V/U constitutes first and second guiding element respectively. One of the free ends of guiding elements is connected to the base and the other to the seat body thereby providing an opening of the V/U into which the seat belt is inserted. The seat belt is thereafter guided by the first guiding element and the second guiding element onto the belt receiving structure. The opening is preferably facing in a backward direction.

In another embodiment of the third aspect of the invention the belt receiving structure may be provided with an indicating structure comprising a first indicating element and a second indicating element, which ensure correct position of the first portion of the seat belt onto the belt receiving structure. These indicating elements have an extension in the longitudinal direction of the safety seat. The indicating structure connected to the belt receiving structure may define a V or an U shape wherein each of the legs of the V/U constitutes first and second indicating element respectively. One of the free ends of indicating elements is connected to the base and the other to the seat body thereby providing the opening of the V/U. The opening of the V/U is preferably facing in a forward direction.

The indicating structure and guiding structure may be combined on the safety seat, the combined structure will thereby display an X-shape.

A safety seat in accordance with the invention may be provided with all three aspects of the invention or with one or two aspects of the invention.

In the following several embodiments of the invention will be described, by way of example, with reference to accompanying drawings, in which.

Figure 1:
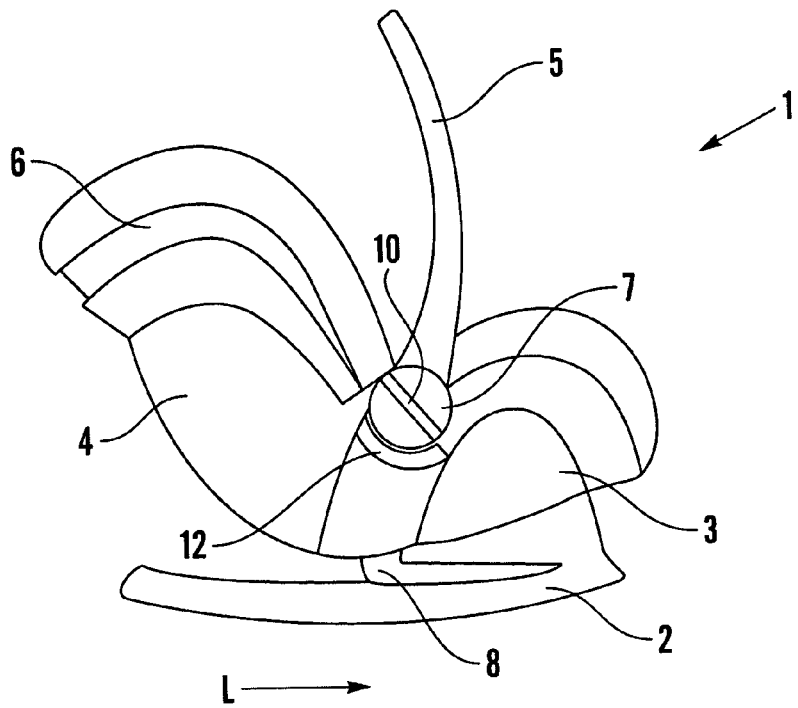
FIGS. 1-3 illustrate views of the safety seat in accordance with the invention.

FIG. 1 shows the safety seat 1 constituted by a seat body arranged onto a base 2. The seat body comprises two seat sections; a sitting section 3 and a back section 4. The longitudinal direction of the safety seat is illustrated by arrow L in FIG. 1. When installed in the vehicle the longitudinal direction of the safety seat coincide with the longitudinal direction of the vehicle, hence the driving direction of the vehicle. A carrying handle 5 is arranged pivotally onto the safety seat 1. A guide 6 for the guiding of a first portion of the seat belt such as the shoulder/diagonal portion of the seat belt are arranged in the outer surface of the back section 4. A tension device 7 with a recess 10 is provided in the area where the carrying handle is pivotally connected to the safety seat 1. Tensioning means 12 is arranged spaced from the tension device 7. A belt receiving structure 8 for a second portion of the seat belt such as the lap portion of the seat belt, is arranged between the seat body and the base.

Figures 2, 3:
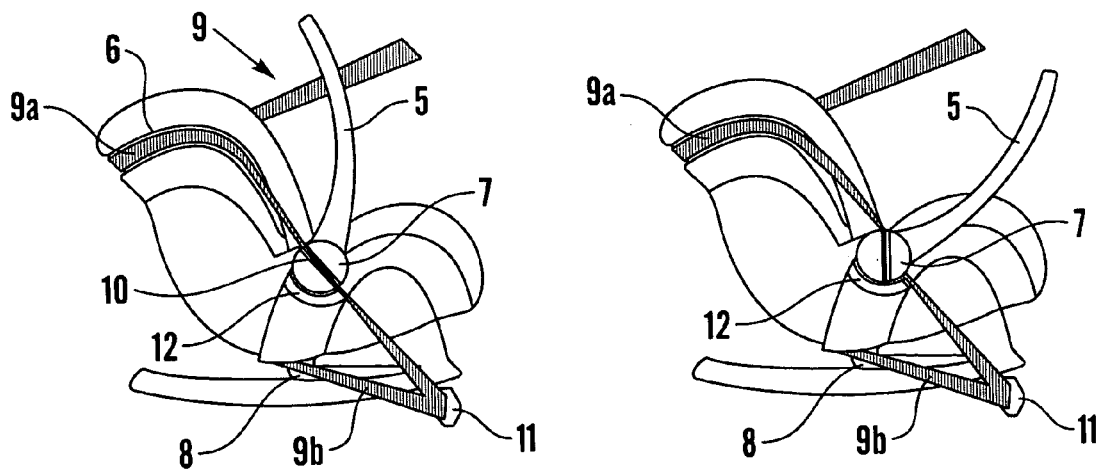

In FIG. 2 the safety seat 1 as illustrated in FIG. 1 is shown with the diagonal portion 9a of the vehicles three-points safety belt 9 positioned in the guides 6 and in the recess 10, which recess is considered being part of the guide 6. The lap portion 9b of the three-points safety belt 9 is arranged onto the belt receiving structure 8. In FIG. 2 the carrying handle 5 is placed in a first position wherein the recess 10 is made available for the diagonal portion 9a to fastened to or released from the recess 10 of the tension device 7. The recess 10 has a depth corresponding to the width of the seat belt and is open at both end portions making a passage for the diagonal portion 9a to be running through to the locking means 11 of the seat belt. The recess is shown with a third opening functioning as an inserting opening for the seat belt to be placed within in the recess. As an alternative the tension device may be made without this inserting opening. The seat belt then needs to be threaded into the recess and this solution might be experienced as more cumbersome by the user, but this solution ensures that the seat belt is kept within the recess in the widthwise direction of the seat belt.

In FIG. 3 the carrying handle 5 has been turned to a second position. The tension device 7 is thereby rotated and the diagonal portion 9a is tensioned by the cooperation between the tension device 7 and tensioning means 12. As the skilled person will understand, the tension device may also function without tensioning means 12. The second position of the carrying handle corresponds to the safe position wherein the safety seat is prevented from crashing into the car seat during a rearward crash. When using safety seats according to prior art the user often fails to turn the carrying handle into this safe position. The tensioning of the seat belt by the carrying handle 5 encourages the user to place the carrying handle 5 in the safe position.

Figure 4:
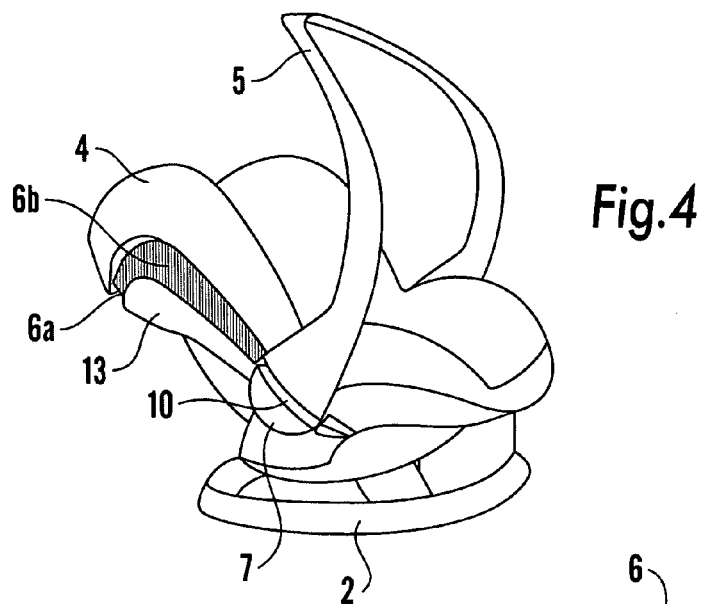
FIGS. 4-8 illustrate views of the guides in accordance with the invention.
Figure 5:
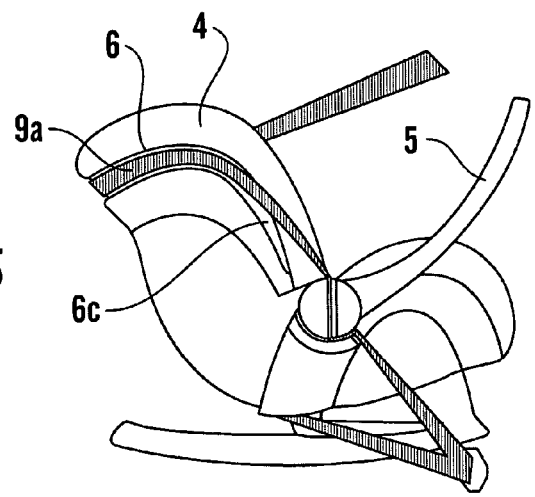

The guide 6 comprises first, second and third guide portions 6a, 6b and 10. First guide portion 6a is formed as a cut out in the outer surface at the rear of the back section as indicated in FIGS. 4 and 5. The second guide portion 6b is provided in the outer side surface of the back section 4. The third guide portion is constituted by the recess 10 of the tensioning device 7.

Figure 6:
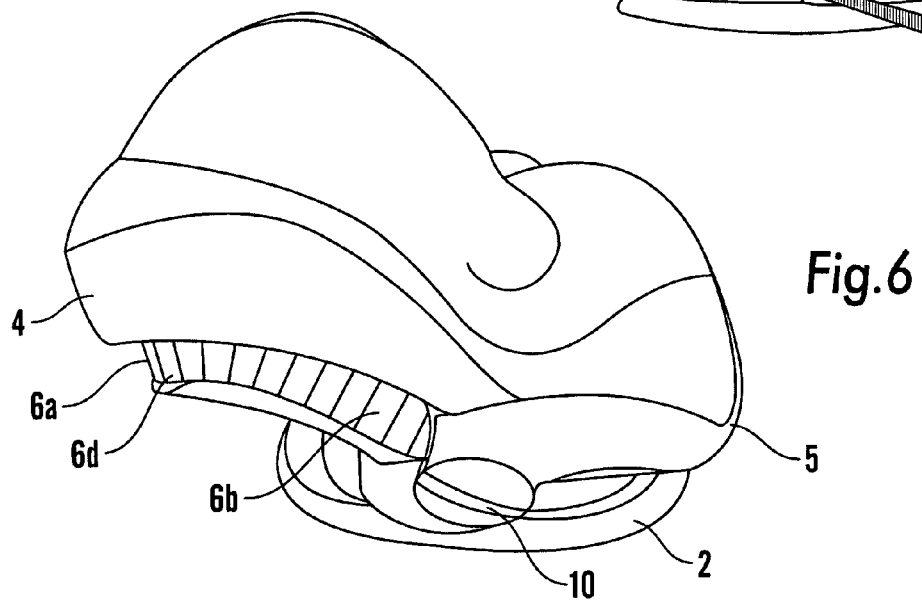
Figure 7:
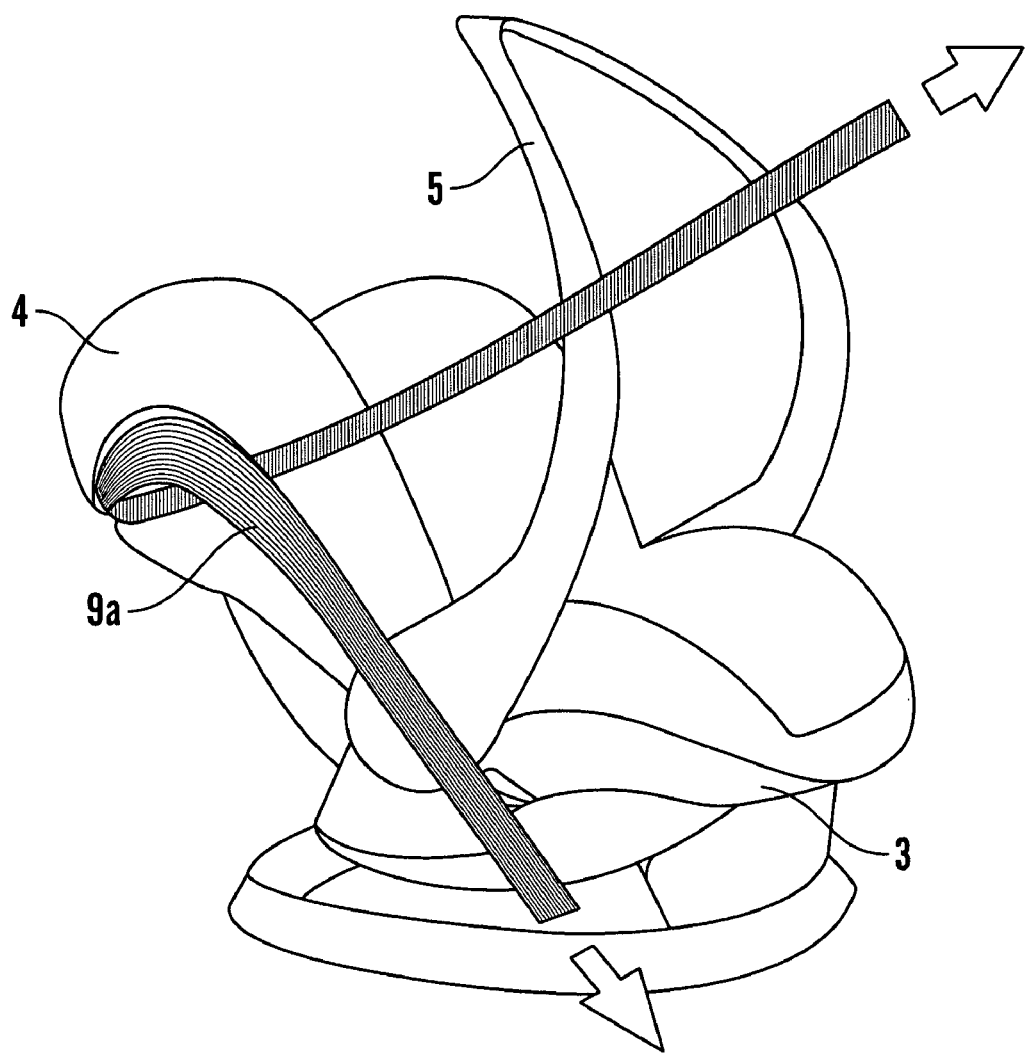
Figure 8:
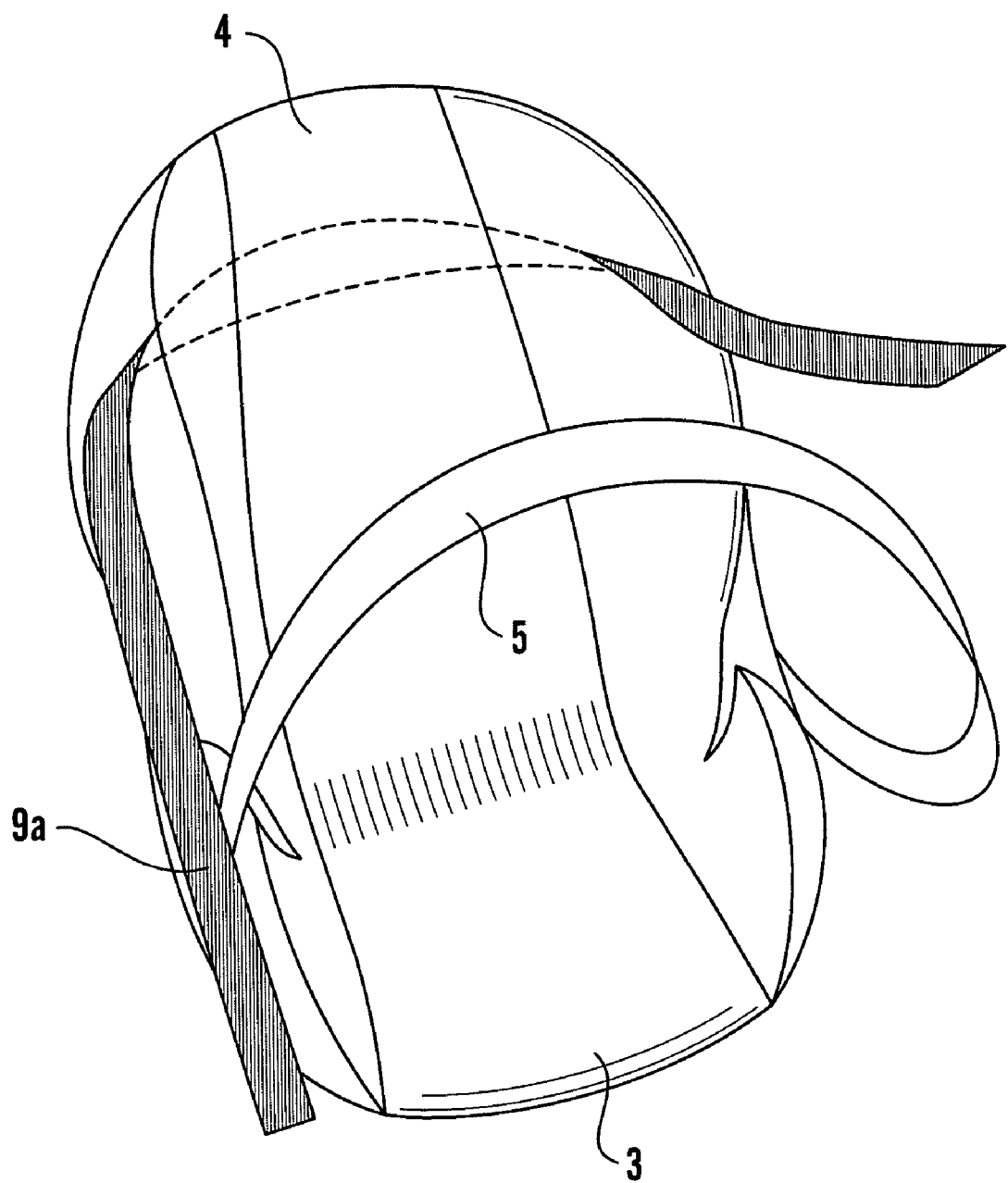

The diagonal portion 9a is positioned into the guide 6 and arranged as illustrated by the shaped curvature of the diagonal portion 9a in FIGS. 7 and 8. One surface of the diagonal portion 9a is arranged in contact with a contact surface of the first guide portion 6a. The first guide portion 6a is provided as a cut out/recess and the bottom of the recess constitutes the contact surface of the first guide portion 6a. The second guide portion 6a is also provided as a cut out/recess or might be provided by a structure 13 attached to the seat body. As seen from the FIGS. 5, 7, 8 the first guide portion 6a (illustrated by the diagonal portion 9a in FIGS. 7 and 8) is following the curvature of the outer surface of the back section from the rear back forward towards the transition into the second guide portion 6b. FIG. 5 shows the contour 6c of the second guide portion 6b as it is sloping downwards toward the third guide portion 10. Unlike the first guide portion 6a which is oriented flat following the curvature of the outer surface of the back section 4, the second guide portion 6b has a contact surface 6c for the diagonal portion 9a which is shaped gradually projecting out from the outer surface of the back section 4 and sloping downwards when moving towards the third guide portion 10. This arrangement is shown in FIG. 6 wherein the second guide portion 6b is illustrated having a flat contact surface 6d close to the guide portion 6a. The contact surface is arranged gradually more angular to the outer surface when moving towards the third guide portion 10. When approaching the third guide portion 10 the angle of the second guide portion 6b obtains an orientation close to the perpendicular. The second guide portion 6b thereby obtains a contact surface 6d in alignment with the third guide portion 10. The diagonal portion 9a placed in the second guide portion 6b is thereby oriented with the surface of the diagonal portion 9a oriented flat close to the first guide portion 6a, wherein the surface is being gradually arranged essentially inclined to the outer surface and is given a perpendicular orientation to the outer surface when entering the third guide portion 10.

Figure 9:
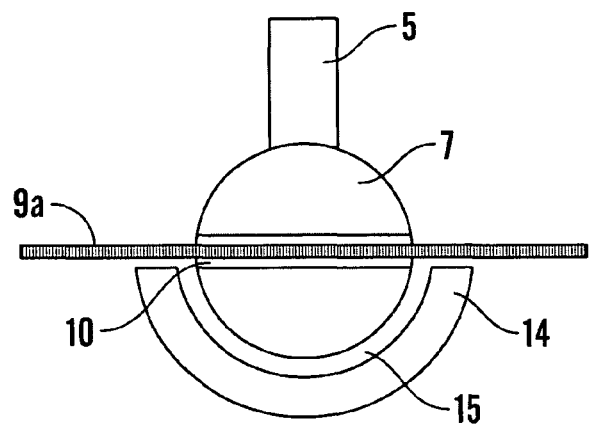
FIGS. 9-11 illustrate views of a tension device in accordance with the invention.
Figure 10:
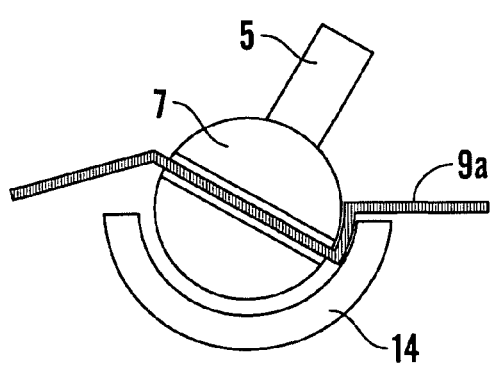

FIG. 9 shows the tension device 7 with the diagonal portion 9a arranged in the third guide portion/recess 10. The seat belt is shown extending from the tension device 7 in a horizontal direction. As an alternative embodiment to prevent the seat belt from slipping out of the recess, the seat belt might be oriented inclined towards the seat body by suitable means when extending from the recess. Tensioning means such as a housing element 14 with a half circular cross section is arranged around the circumference of the tension device 7 thereby providing a space 15 between the housing element 14 and the tension device 7. The housing element 14 has a length corresponding to the width of the diagonal portion 9a to make sure that the diagonal portion 9a is tensioned equally along its width. When the diagonal portion 9a has been positioned in the guides, the carrying handle 5 is turned into second position as shown in FIG. 3 thereby providing a position suitable when the safety seat is to be placed in driving position in a vehicle. When bringing the carrying handle 5 into the second position, the tension device is rotated and the diagonal portion 9a is inserted into the space 15 as shown in FIG. 10 and the diagonal portion 9a is tensioned.

Figure 11:
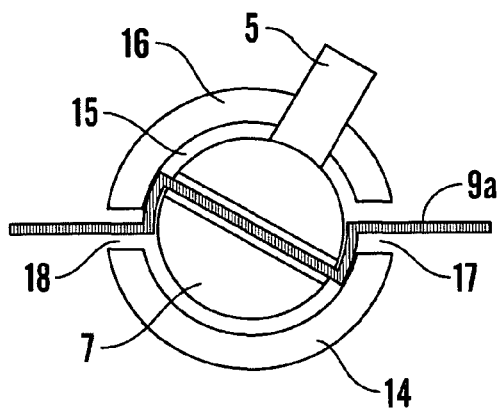

FIG. 11 shows an embodiment wherein two housing elements 14, 16 are arranged with a space 15 to the tension device 7. Two passages 17, 18 are arranged in between the housing elements 14, 16 for the diagonal portion 9a to be placed into the recess 10. When the tension device is rotated by the carrying handle 5 tension is applied at two areas of the diagonal portion 9a as a result of the cooperation between the tension device 7 and the two housing elements 14, 16 respectively. As the skilled person will understand the tension device 7 may also function without a housing elements.

Figure 12:
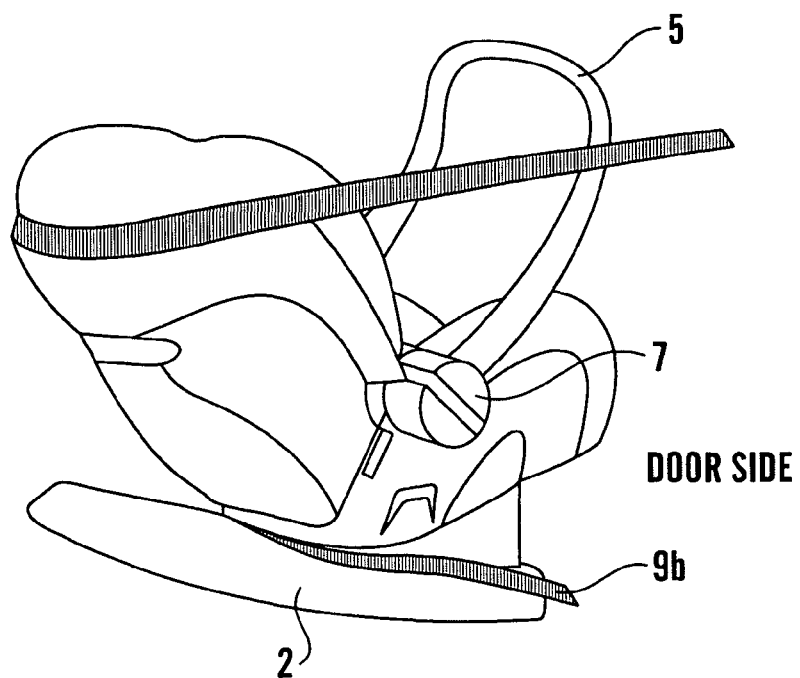
FIGS. 12-20 illustrate views of a belt receiving in accordance with the invention.
Figure 13:
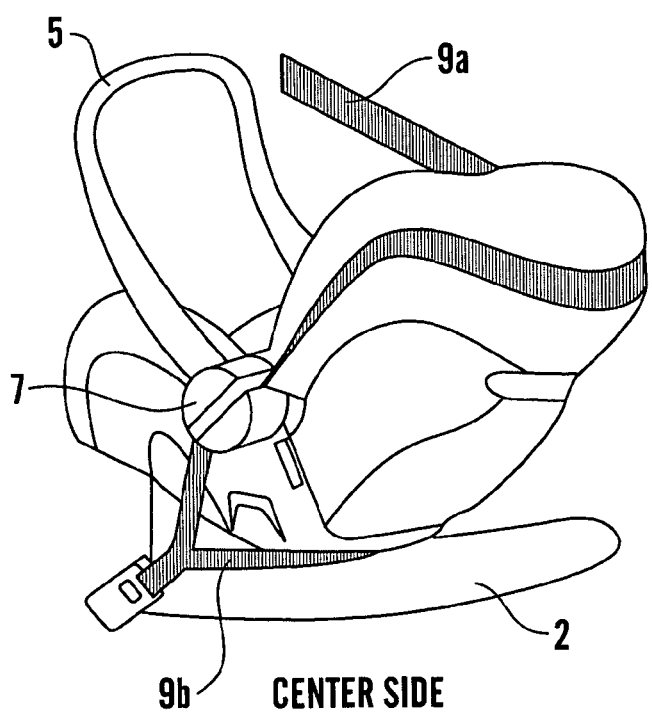

FIGS. 12 and 13 show the placing of the lap portion 9b of the three-point safety belt (one end of the shown lap portion 9b runs towards the anchorage in the car, the other end of the shown lap portion 9b runs towards the locking means of the three point safety belt). The lap portion 9b is to be placed between the base 2 and the seat body onto a belt receiving structure 20 which may be constituted by a plate body as the one in FIG. 14. When guiding the lap portion 9b between the seat body and the base the lap portion 9b will be placed onto the belt receiving structure 20. The lap portion 9b will be positioned between the seat body and the belt receiving structure 20 at the first portion 21 of the belt receiving structure 20. A belt twisting portion which is shown in the FIGS. 14-16 as an edge 23 of the plate body causes the lap portion 9b to be twisted and folded so that the lap portion 9b is positioned between the belt receiving structure 20 and the base at the second portion 22 of the belt receiving structure 20. It is seen from the figs that the belt receiving structure is fixed to a column 29. This column 29 carries the weight of the safety seat and provides the connection between the seat body and the base.

Figure 15:
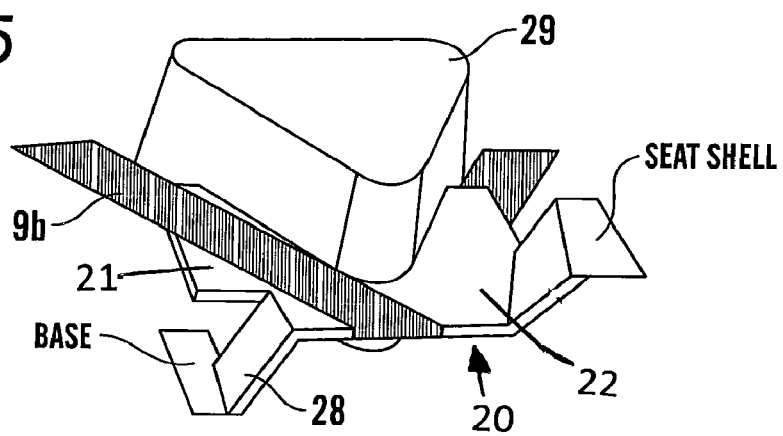

To ensure the correct position of the lap portion 9b the first portion 21 of the belt receiving structure 20 may be connected to the base by a leg 28. The second portion 22 of the belt receiving structure 20 may be connected to the seat body by a leg 27 as illustrated in FIG. 15. The contact surface of the lap portion 9b is in contact with the upper surface 25 and lower surface 26 of the plate body respectively. A structure which is provided to carry the seat body may also function as a support 29 for guiding the lap portion 9a in the lengthwise direction as shown in FIGS. 12 and 13.

Figure 16:
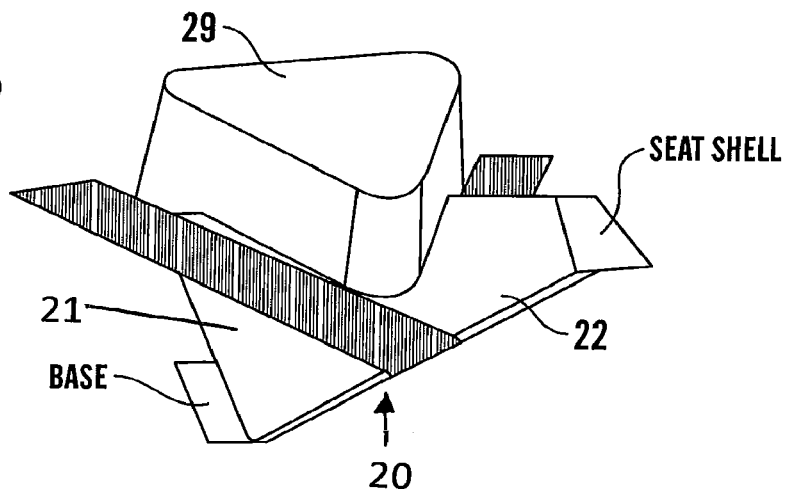

FIG. 16 shows an embodiment wherein the plate body is oriented inclined. In accordance with this embodiment the plate body may be attached to the base and seat body without the use of legs.

Figure 17:
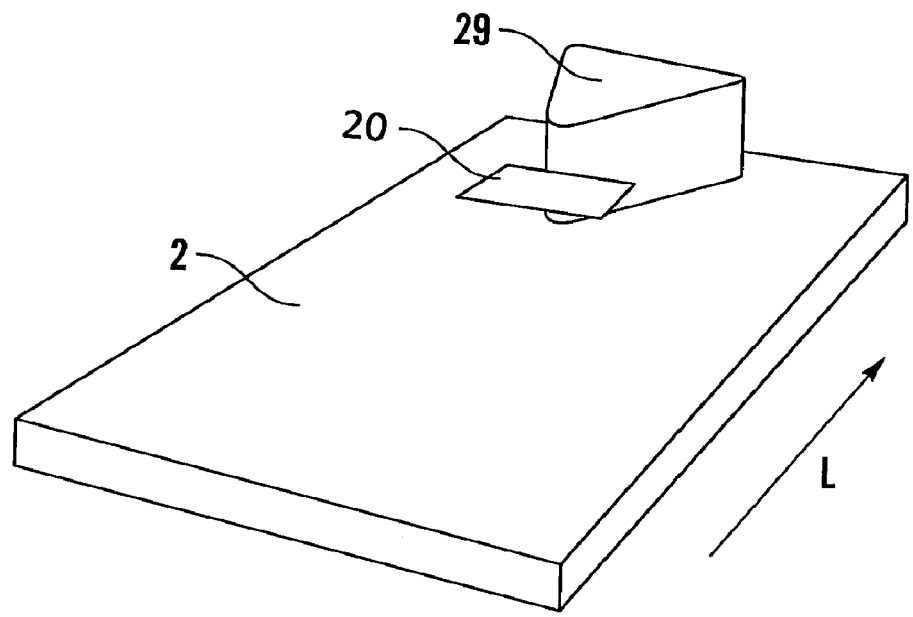

FIG. 17 is a schematic illustration of the belt receiving structure 20 connected to the column 29. The longitudinal direction of the safety seat is illustrated by arrow L.

Figure 18:
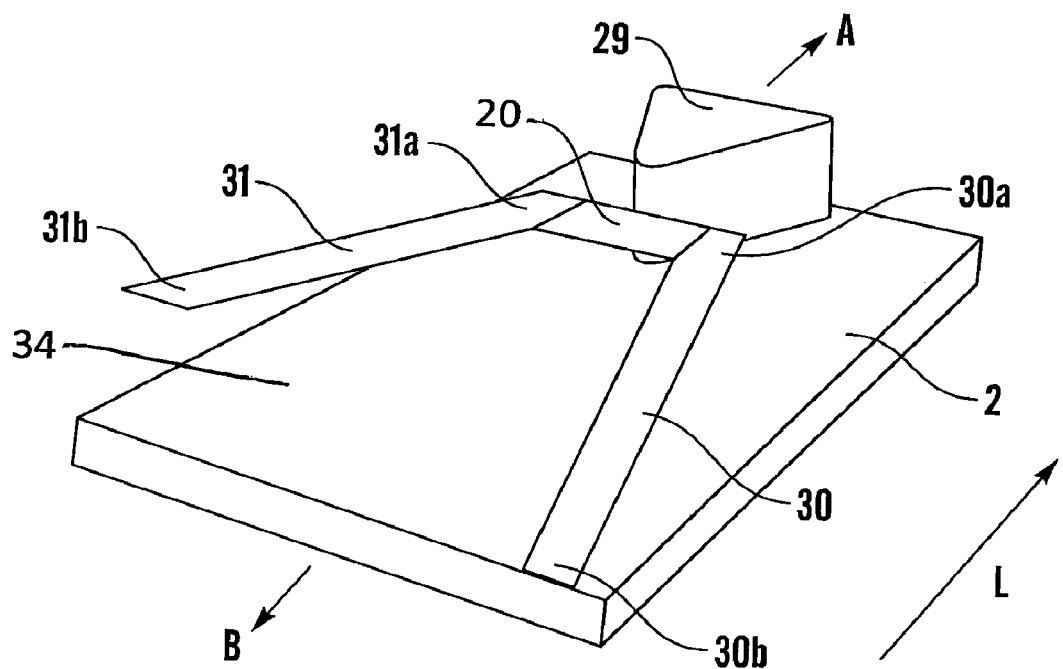

In FIG. 18 the belt receiving structure 20 is shown arranged with a V-shaped guiding structure comprising a first guiding element 30 and a second guiding element 31. These guiding elements have an extension in the longitudinal direction L of the safety seat. The first end 30 a of the first guiding element 30 is fixed to the belt receiving structure 20 and the second end 30b of the first guiding element 30 is fixed to the base 2. The first end 31 a of the second guiding element 31 is fixed to the belt receiving structure 20 and the second end 31b of the second guiding element 30 is fixed to the seat body (not shown).

Arrow A illustrates the backward direction and arrow B illustrates the forward direction of the safety seat when installed in the vehicle. By inserting the lap portion of the seat belt into the opening 34 in between the first guiding element 30 and the second guiding element 31, the lap portion is guided by the first guiding element 30 and the second guiding element 31 for correct positioning onto the belt receiving structure 20 (not shown in FIG. 18, se FIGS. 14-16).

Figure 14:
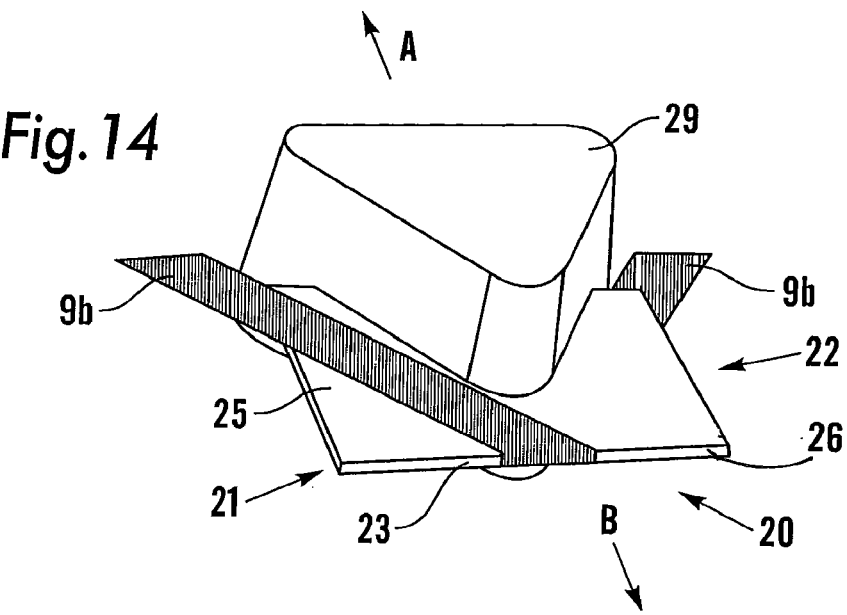
Figure 19:
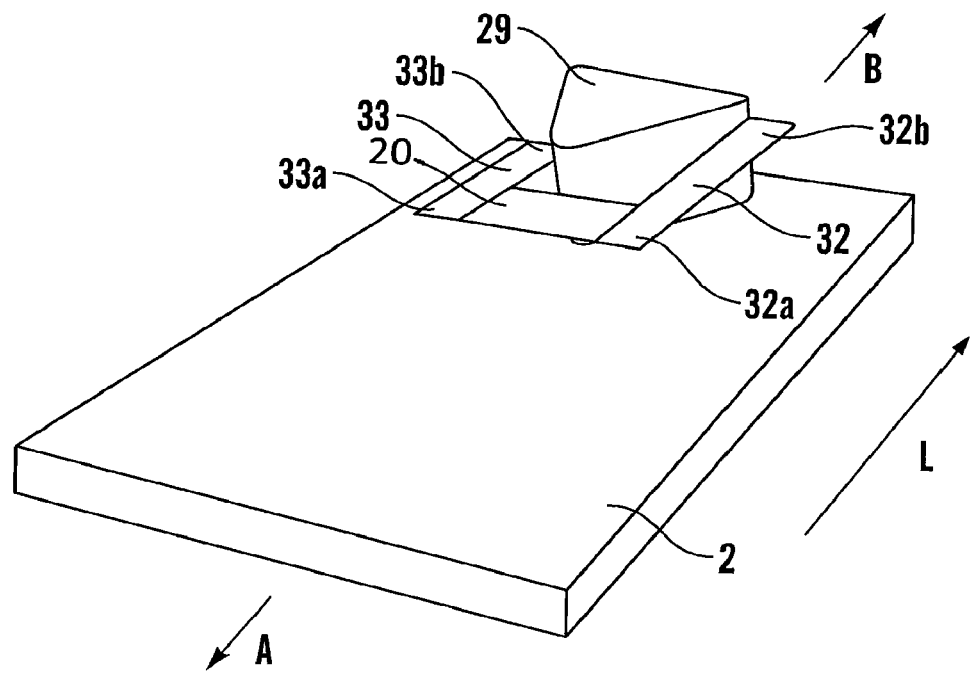

In FIG. 19 the receiving structure 20 is shown arranged with a V-shaped indicating structure comprising a first indicating element 32 and a second indicating element 33. These indicating elements have an extension in the longitudinal direction L of the safety seat. The first end 32 a of the first indicating element 32 is fixed to the belt receiving structure 20 and the second end 32b of the first indicating element 32 is fixed to the seat body (not shown). The first end 33 a of the second indicating element 33 is fixed to the belt receiving structure 20 and the second end 33b of the second indicating element 33 is fixed to the base 2. The indicating elements function as indicators as to where the lap portion is to be positioned when correctly positioned onto the belt receiving structure 20 (not shown in FIG. 19, se FIGS. 14-16 showing the correct position of the seat belt).

Figure 20:
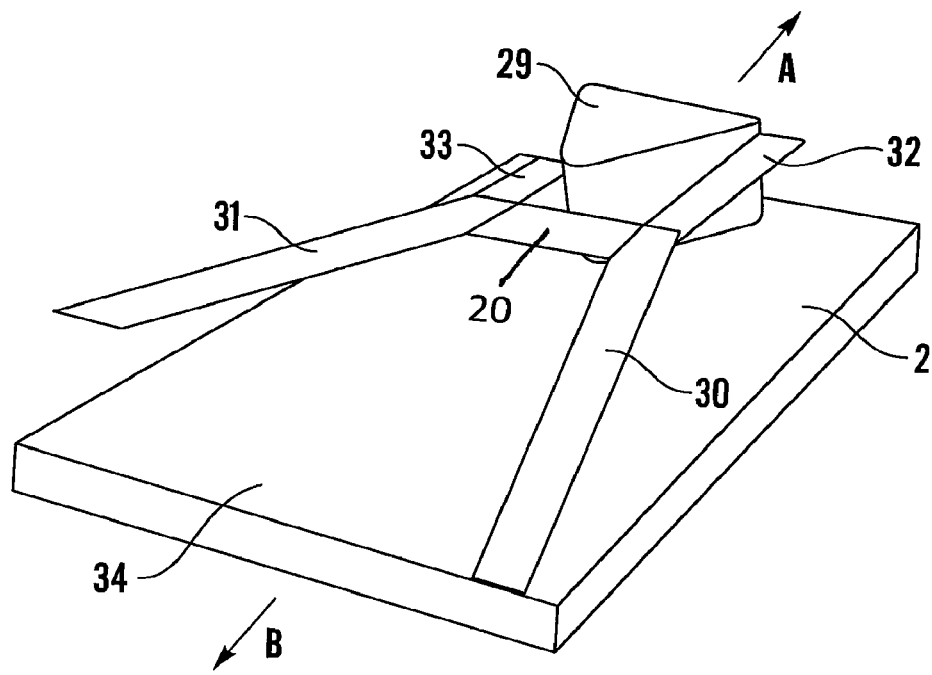

FIG. 20 shows the combination of the indicating structure shown in FIG. 19 and guiding structure shown in FIG. 20, thereby display an X-shaped structure.

The invention claimed is:

1. Children safety seat for a vehicle having a seat belt, comprising a seat body arranged onto a base, and having a belt receiving structure for the seat belt arranged between the seat body and the base, the belt receiving structure comprising a seat belt folding portion being arranged horizontally or inclined in the width direction of the child safety seat, said seat belt folding portion comprising a first upper surface, a second lower surface and a common edge intermediate the two surfaces, wherein the upper and lower surfaces are arranged as contact surfaces for the seat belt, such that when in use a portion of the seat belt is arranged to be passing between the belt receiving structure and the seat body in contact with the first, upper surface of the seat belt folding portion, is folded over the common edge, and passes back in substantially the opposite direction between the belt receiving structure and the base in contact with the second, lower surface of the seat belt folding member, and thereafter buckled in the seat belt buckle of the vehicle.

2. A child safety seat according to claim 1, wherein the upper and lower surfaces of the seat belt folding portion are parallel with each other.

3. A child safety seat according to claim 2, wherein the seat belt folding is in the form of a plate arranged horizontally, wherein the first upper surface is the upper surface of the plate and the second lower surface is the lower surface of the plate.

4. A child safety seat according to claim 1, wherein the seat belt folding portion is arranged at an incline, with a first end of the seat folding portion connected to the base and a second end of the seat belt folding portion connected to the base.

5. A child safety seat according to claim 1, wherein the seat belt folding portion is connected to a column that bears the weight of the seat body.

6. A child safety seat according to claim 5, wherein the seat belt folding portion is connected to the base by a first elongated guide member, connected at one end to the seat belt folding portion, and connected at a second end to a forward side of the base, when seen in the direction of travel, and wherein the seat belt folding portion is connected to the seat body by a second elongated guide member, connected at one end to the seat belt folding portion, and connected at a second end to the forward side of the seat body, when seen in the direction of travel.

7. A child safety seat according to claim 1, wherein the seat belt folding portion is connected to the base by a first elongated guide member, connected at one end to the seat belt folding portion, and connected at a second end to a forward, side of the base, when seen in the direction of travel, and wherein the seat belt folding portion is connected to the seat body by a second elongated guide member, connected at one end to the seat belt folding portion, and connected at a second end to the forward side of the seat body, when seen in the direction of travel.

8. A child safety seat as in any of the preceding claims, further comprising a seat belt tensioning device integrated into a rotatable carrying handle, said tensioning device being arranged to receive a portion of the seat belt when the handle is in a first position, and to tension the seat belt upon rotation of the handle to a second position.

* * * * *